2 Sheets—Sheet 1.

W. C. HICKS.

DROP-PRESS.

No. 7,788. Reissued July 10, 1877

Witnesses
H. L. Bennett
Lyman Warner

Inventor
Wm Cleveland Hicks
By Thos D. Cook
Atty

2 Sheets—Sheet 2.

W. C. HICKS.

DROP-PRESS.

No. 7,788. Reissued July 10, 1877.

Witnesses
H. L. Bennem
Lyman Warner

Inventor
Wm Cleveland Hicks
By Thos B Thorp
Atty

UNITED STATES PATENT OFFICE.

WILLIAM CLEVELAND HICKS, OF SUMMIT, NEW JERSEY.

IMPROVEMENT IN DROP-PRESSES.

Specification forming part of Letters Patent No. 37,445, dated January 20, 1863; Reissue No. 7,788, dated July 10, 1877; application filed October 13, 1875.

*To all whom it may concern:*

Be it known that I, WILLIAM CLEVELAND HICKS, of Summit, in the county of Union and State of New Jersey, (formerly of the city, county, and State of New York,) have invented certain Improvements in Drop-Presses, of which the following is a specification:

My invention relates to drop-presses or drops used in gun-shops, jewelry-shops, and other like establishments for working metals by forging, stamping, or embossing, and in which the hammer is elevated by means of a belt, strap, or connection with lifting mechanism, and allowed to fall by its own weight upon the metal to be worked.

One part of the said invention consists in the device hereinafter described for unwinding the hammer-belt from the lifting-drum, so as to prevent its retarding the descent of the hammer, as hereinafter more fully set forth.

Another part of the said invention consists in the construction and combination of parts hereinafter set forth, by which the lifting-drum is made capable of drawing up the belt, strap, or connection which connects it with the hammer, at its maximum speed, or substantially so, at the end of the stroke of the hammer, substantially as hereinafter more fully set forth.

Another part of the said invention consists in the construction, combination, and arrangement of parts hereinafter described by which the device which throws the lifting apparatus into action is entirely released from the control or action of the lower portion of the descent of the hammer, substantially as hereinafter more fully set forth.

Figure 1:
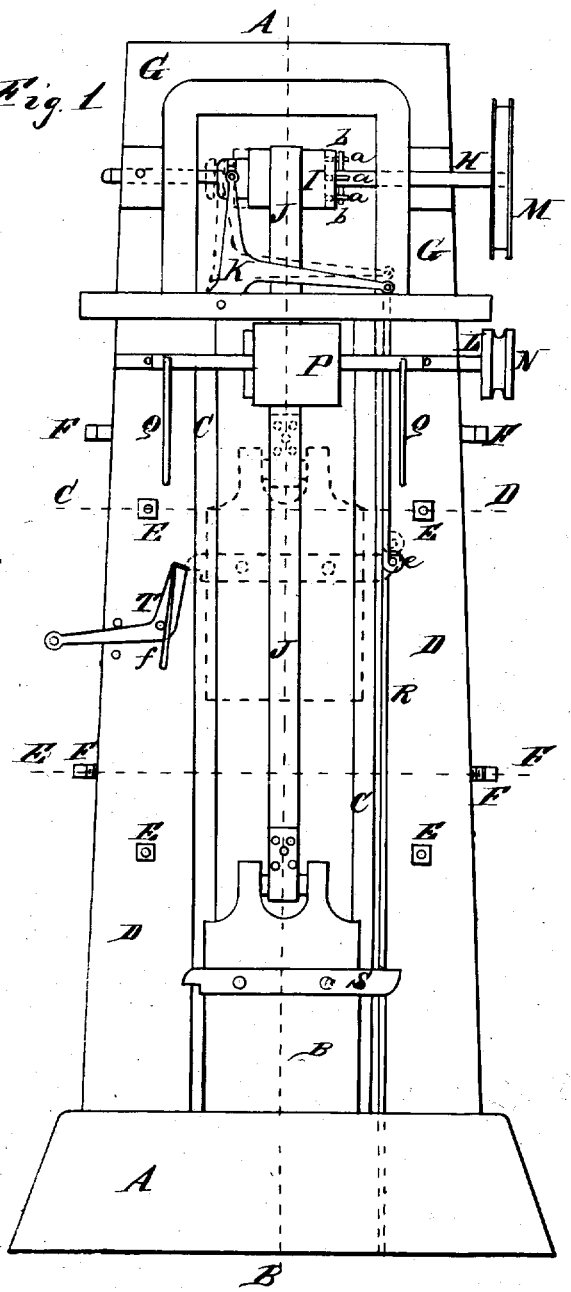
Figure 2:
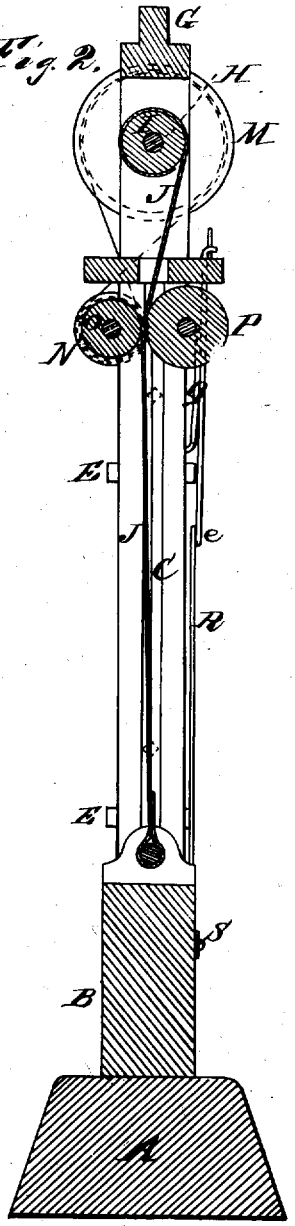
Figure 3:
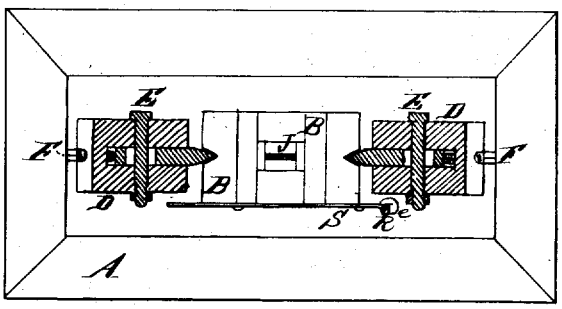
Figure 4:
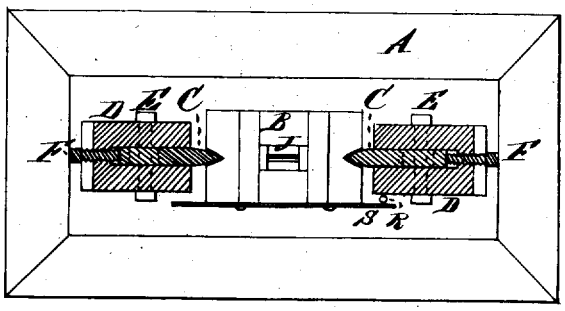

Figure 1 is a front elevation of a drop-press constructed according to my invention. Fig. 2 is a vertical section of the same, showing the parts at the right hand of the line A B drawn across Fig. 1. Fig. 3 is a horizontal section showing the parts below the line C D drawn across Fig. 1. Fig. 4 is a horizontal section showing the parts below the line E F drawn across Fig. 1.

A is the base of my drop-press, which base is usually called the "anvil," and B is the hammer, both of which are constructed, in most respects, similar to those previously in use, and both of which are provided with beds or sockets in which to secure the dies to give form to the piece or article to be made by the action of the hammer upon the anvil.

The hammer is guided in its up-and-down motion by ways C, secured in upright posts D, which are let into and held in the anvil by mortise-and-tenon joints. The ways are separate from the posts, as shown, instead of being made in the same pieces, said ways being let into vertical grooves in the said posts, and held firmly therein by lateral pressure produced by means of the bolts E, which extend through both the post and the way, and when these bolts are screwed up tightly the ways are firmly clamped in the posts, and secured against the effects of the jars incident to the operation of the drop. By this construction and arrangement, and by the use of the set-screws F, I am enabled to perfectly adjust the ways, so as to make them fit accurately, and secure precision in the operation of the hammer throughout its whole stroke.

The posts D are surmounted and laterally braced by a head-frame, G, in which is hung the lifting-shaft H, which carries the lifting-drum I, said drum I being connected to the shaft H by a clutch-connection, one end of the drum being provided with studs *a*, which engage with the transverse pin *b*, extending outwardly from the shaft H when the drum is thrown sufficiently toward the pin by the clutch-lever K.

J is a belt, strap, or connection, made of any suitable material, and through the instrumentality of which the drum I raises the hammer B.

The shaft H is connected with some prime mover or power-shaft by means of a belt passing over an outside pulley, so that when in operation it shall have a constant rotation in but one direction.

Said shaft H is also connected with another shaft, L, which may be done by either cog-wheels or friction wheels, or by a crossed belt running over pulleys M and N on the respective shafts, so that the shaft L shall rotate in a contrary direction from that of the rotation of the shaft H, the shaft L, which I call the "unwinding-shaft," being so connected with the shaft from which it derives motion as to have two or even more revolutions to each single revolution of the lifting-shaft.

The shaft L carries a drum, O, which reaches or nearly reaches the center of the drop.

On the other side of the posts D and at the same elevation as the unwinding-shaft, there is an axle carrying a drum, P, which presses on the belt, strap, or connection between the hammer and the lifting-drum with an elastic pressure derived from the springs Q bearing on the axle, and holding it in open journal-boxes or recesses, which may be wrought directly in the posts D.

The clutch which connects the drum I to the shaft H is actuated by a rod, R, connected to the clutch-lever K, and which may descend to or into the anvil, as shown. The weight of this rod and of the horizontal arm of the clutch-lever K should be sufficient to throw the clutch into gear, and to overcome the friction of the parts with sufficient preponderance to insure substantial uniformity in its operation as to time; or, if the rod R and the horizontal arm of the lever are not heavy enough for the purpose, they may be aided by a spring.

S is a lifter attached to the hammer, which lifter in its ascent strikes against a collar or stud, *e*, on the rod R, and as the hammer continues to rise raises the rod R and throws the clutch out of gear, thus stopping the action of the lifting-drum and arresting the ascent of the hammer.

T is a catch or trigger, pivoted to the left-hand post D, and as the hammer rises to its highest position, this catch T is forced by a spring, *f*, under the end of the lifter S, and prevents the descent of the hammer till the catch is withdrawn, which may be done by the foot or hand of the operator pressing downward on its nearly horizontal arm.

Operation: The proper dies having been inserted and the work being ready, rotation is given as above suggested, or by any suitable means to the lifting-shaft H, and the clutch already described being in gear and the connection J extending up to the lifting-drum and in contact with the circumference of the same, the lifting-drum draws up the belt J, and with it the hammer B till the lifter S has passed above the catch T, and has also raised the rod R sufficiently to unship the clutch which connects the shaft H with the drum I, which unshipping of the clutch releases the drum I from the rotation of the shaft H, and the hammer is consequently raised no farther; but is supported by the trigger T till that is disengaged, as already suggested.

When the connection J is wound upon the lifting-drum, as will be the case when the machine is constructed exactly as shown in the drawings, it is necessary that it shall be again unwound to allow the hammer to fall upon the anvil; and though this might be done by the weight of the hammer itself in its descent, the force thus taken from the hammer would act as a drag upon its descent, and detract somewhat from the force of the blow. And to obviate this objection, the drum O, running in a direction to draw the connection J downward, and with a speed adequate to secure sufficient promptness, as already indicated, is made to grasp the connection J between it and the drum P with sufficient force to unwind it, and by this means the said connection is unwound with sufficient rapidity to prevent this unwinding operation from interfering at all with the descent of the hammer.

Previous to my invention drop-presses had been constructed in which a lifting-drum connected by a clutch to a lifting-shaft had been connected to the hammer by a strap which required its whole length to be run out to enable the hammer to strike a clean blow, and the clutch was engaged by the hammer near the end of its descent, striking a shifting mechanism, so as to cause the lifting-drum to commence taking up the strap at just about the time, or just after the time, that the blow was struck.

The consequence was that the hammer, by violently striking the shifting mechanism, was liable not only to lift the hammer and to hinder and derange its blow, but also to render the action of the shifting mechanism uncertain, and to derange and finally destroy it, while the lifting-drum, commencing to wind up the strap only when the hammer fell, and then necessarily from a dead-center, did not at first draw up the strap quickly enough to prevent the hammer from rebounding upon the work, and often spoil it by so doing.

In my invention these difficulties are obviated by entirely isolating the clutching or engaging apparatus from the action of the hammer after it has left its upper position, and by giving said engaging apparatus sufficient time to operate deliberately and with precision, and by combining the lifting-drum, the hammer, and the connection between them, in a way which allows and enables the lifting drum to take up the connection with nearly or quite its maximum speed immediately upon the delivery of the blow, and thus preventing the hammer from rebounding upon the work.

When the parts are combined and arranged as I have preferred to arrange them, as above described, the hammer, on being released by the withdrawal of the trigger or catch T, descends immediately, and without obstruction or hindrance upon the work; and as its descent is governed by the acceleration of gravity, its time of descent will be substantially uniform and easily calculated, and the action of the other parts of the machine made to correspond; and the rod R and clutch-lever K should have sufficient weight and such range of motion as to operate in the proper time to cause the lifting-drum to commence taking up so much of the connection J as is required to reach to the end of the stroke of the hammer immediately upon the hammer delivering its stroke, or at least so soon thereafter as to catch the rebound of the hammer and prevent its falling again upon the work. This can be arranged with very great accuracy, as the shifting mechanism is released from the action of the hammer by a gentle motion just at the commencement of its descent, and is not subjected to the uncertainty of a jostling blow of the hammer in the lower part of its stroke.

By the means I have described the engaging mechanism is thrown into play by the descent of the hammer immediately after it has commenced such descent, unless it should be held out of operation longer by the operator, which he may do by holding up the rod R a little after the lifter S has left the stud *e* at the commencement of the descent of the hammer, should it on any occasion, or for any reason, be desirable.

The connection J is made at least long enough to reach a radial line passing through the lifting-drum at right angles to the said connection, and the motions are so arranged that the lifting-drum operates at that point and in that position to take up this connection from the end of the stroke of the hammer, and thus take up the rebound and raise the hammer at substantially its maximum lifting-speed from the point of contact of the hammer with the anvil and immediately upon the blow being given, instead of, as heretofore, commencing to take up this rebound by operating upon the connection at a point nearly or quite directly under the center of the lifting-shaft, or, in other words, nearly or quite at its dead-center, where its initial speed, in taking up the rebound of the hammer, is nearly or quite null, or, at any rate, much below its maximum speed, and is too slow to catch the rebound before the hammer will fall again upon the work.

It will be observed, by an examination of the construction of the parts and a consideration of their necessary operation, that the lifting-drum is in full connection with the lifting-shaft, and consequently with the prime mover, at and before the delivery of the blow of the hammer, so that it is in actual rotation in the proper direction for taking up the rebound and raising the hammer before it is required to perform those services, and consequently it is not necessary at the moment those services are required to also overcome the inertia of the lifting-drum itself.

I am aware that the patent No. 10,720, granted to Solomon Andrews April 4, 1854, for a drop and die forging and punching machine, describes and shows a stamp or hammer designed to operate as a drop, an automatic engaging and disengaging device, a rack or spur gear formed in the side of the said hammer, and a lifting spur-pinion to raise the hammer by operating upon the rack above mentioned. This I do not claim.

My invention, however, differs widely from the said invention of Andrews in its essential character, capabilities, and results, for it will be seen at a glance that the rigid rack and the pinion gearing into it, as described in Andrews's patent, involves the necessity that the speed and direction of motion of the pinion and hammer must always coincide, as the construction is such that the one can neither be allowed to slip upon the other, nor move except in consonance with it; while in my machine, which embodies a lifting-drum instead of a pinion, and a suitable connection to act with it instead of a rack, these motions are not at all times strictly held to correspondence with each other; and I am thus enabled to have the lifting-drum in revolution in the lifting direction at and even before the delivery of the blow of the hammer, thus avoiding the necessity of waiting until after the blow is struck, and then afterward throwing the clutch into gear, which is to give the lifting motion, avoiding, by my invention, the loss of time and rebounding of the hammer upon the work on the one hand, or the danger of breaking the machinery and the loss of the blow, or, at least, a portion of its efficiency, on the other.

I claim as my invention—

1. The method of unwinding the hammer-belt immediately upon its reaching the requisite elevation, by the employment, in combination with the ordinary winding-drum, shipping-clutch, and appurtenances, of auxiliary friction rolls or drums, the whole being arranged to operate substantially in the manner and for the purposes set forth.

2. The combination, with the hammer, lifting-drum, and connection between them, of an engaging and disengaging device, and parts for operating the same in the upper part of the stroke of the hammer, leaving it free from the control of the hammer in the lower portion of the stroke, as set forth.

3. The combination, with the hammer and its lifting connection, and with a disengaging mechanism for disengaging the hammer from the action of the lifting-shaft, and with a catch for retaining and releasing the hammer, of a lifting-drum, having a connection at the time of and before the delivery of the blow of the hammer with the driving parts of the device, for the purpose hereinbefore set forth.

WM. CLEVELAND HICKS.

Witnesses:
JOHN MCMANUS,
THOS. P. HOW.